United States Patent [19]
Bohl et al.

[11] Patent Number: 4,521,089
[45] Date of Patent: Jun. 4, 1985

[54] OPTICAL WINDOW PURGE ARRANGEMENT

[75] Inventors: Thomas L. Bohl, Madison; Richard C. Ciammaichella, Newbury, both of Ohio

[73] Assignee: The Babcock & Wilcox Company, New Orleans, La.

[21] Appl. No.: 542,876

[22] Filed: Oct. 17, 1983

[51] Int. Cl.³ .............................................. G02B 7/00
[52] U.S. Cl. .................................................. 350/582
[58] Field of Search ............................... 350/584, 582

[56] References Cited
FOREIGN PATENT DOCUMENTS
1243968 7/1967 Fed. Rep. of Germany ...... 350/582

Primary Examiner—John K. Corbin
Assistant Examiner—Lynn Vandenburgh Kent
Attorney, Agent, or Firm—Vytas R. Matas; Robert J. Edwards

[57] ABSTRACT

An arrangement for isolating an optical surface from a contaminating environment utilizes concentric inner and outer tubes defining an annular purging space therebetween. The inner and outer tubes are both open ended with the open ends facing the contaminating environment. The optical surface is positioned in the inner tube and is spaced from the open end of the inner tube. The inner tube is made of porous material and the space is supplied with a purging gas so that at least some of the purging gas filters into an inner space of the inner tube to prevent an aspiration of contaminants into the inner tube from the open end thereof. A preferred porosity range of 1 to 40 microns is selected for the inner tube which preferably has a length to diameter ratio of from about 5 to 1.

10 Claims, 2 Drawing Figures

OPTICAL WINDOW PURGE ARRANGEMENT

FIELD AND BACKGROUND OF THE INVENTION

The present invention relates in general to instruments having an optical window and, in particular, to a new and useful arrangement for purging the window of contaminating substances.

Instruments using optics that are subjected to dirty gas streams have the problem of maintaining cleanliness of the optics so that the readings are not biased by accumulated material that would absorb light. Conventional means of keeping the surfaces clean consist of blowing clean air across a window or lens thereby displacing any dirt ladened gases and maintaining a clean surface. Unfortunately, a source of clean air in the vicinity of the instrument is frequently difficult to find. Filtering the inlet air helps, but also requires filter maintenance. Even good filters on blower inlets allow small particles to be blown on the optical surfaces and will eventually coat, or worse, etch the surface. Compressed air offers no solution as it contains moisture and oil which will be deposited on the surface, and for other reasons such as a cooling effect on the surface, is undesirable to use.

A typical solution to the problem is to introduce purge (clean) air into an annular space 14 between concentric solid wall pipes to tubes 10,12 as shown in FIG. 1 which are supported on a wall 32. Purge air entering the instrument at 20 will not contact the optic surface 22 directly and should form an air curtain at the end 24 of the insolation tube 10 to prevent process dirt from process area 30 from contacting the optics 18 of instrument 16. In practice, this situation does not occur. The air traveling through the annulus 14 aspirates the inside of the isolation tube 10, causing it to be at a pressure lower than the pressure in the sighting pipe 12. This effect causes process gas and entrained dirt to be carried back to the optics 18.

A relevant patent is U.S. Pat. No. 3,310,356 to Borberg, which discloses a device for protecting lenses typically used in a television camera employed in an industrial application. This reference acknowledges that a low pressure area is created in front of the lens due to aspiration. It compensates for this condition by introducing air at a pressure higher than the purge air and allowing this higher pressure air to either go through an aperture in a lens or be transmitted through a shield in front of the lens. In this manner, the effects of aspiration can be reduced since the low pressure air will be directed away from the lens by means of the high pressure air. No isolation tube is used however, and air at two different pressures is needed.

U.S. Pat. No. 2,856,542 to McPheeters shows the use of high pressure air to direct dirt laden air away from the lenses in a transmitter and a receiver of a photo electric system. In effect, the high pressure air forms a wind curtain around the lenses, thus preventing the dirt laden air from impinging thereon. Here again, an isolation tube is not utilized.

SUMMARY OF THE INVENTION

The present invention utilizes an isolation tube which is made of a porous material, such as layers of filter screen or from sintered metals. These materials are currently used in fabricating gas filters. Layered screen materials in cylindrical shapes are available from Bendix Corporation and sintered metal shapes are available from Mott Metallurgical Corporation.

By using an isolation tube having a porosity in the 1 to 40 micron range, a portion of the purge air can penetrate the tube walls thereby relieving any negative pressure generated by aspirating effects, and prevent backflow of process gases. Particles in the purge air are kept from contacting the optic surface by proper selection of the tube wall porosity to prevent passage of the entrained particles.

As stated, controlled porosity in the 1 to 40 micron size is needed for the invention. Porosity is limited by having too much flow restriction at the low end of the porosity range, thereby approaching a solid wall tube and allowing aspiration to occur, and at the high end the tube would allow too many particles to pass through the wall and contact the optic surface. Five micron material is the best size for most applications.

The isolation tube should have a length to diameter ratio of approximately 5 to 1, be open at both ends, and have means to secure it to the instrument body by welding, bonding, threading or other suitable means.

Accordingly, an object of the present invention is to provide an apparatus for isolating an optical surface of an optical element from a contaminating environment, comprising, an outer tube which may be cylindrical, square or have any other cross-sectional shape, the tube having an opened end communicating with the contaminating environment. An inner tube which likewise has any desirable cross-sectional shape, is disposed within the outer tube and also has an opened end. A space is defined around the sides and opened end of the inner tube and the outer tube. Purging gas means are connected to the outer tube for supplying a purging gas to this space. The optical element is engaged or otherwise associated with the inner tube so that its optical surface is in the inner space of the inner tube and spaced from the opened end of the inner tube. The inner tube is made of porous material so that at least some of the purging air enters the inner space of the inne tube.

Another object of the invention is to provide a method of isolating an optical surface from a contaminating environment by providing, in a concentric arrangement of inner and outer tubes defining an annular space, the inner tube to be made of porous material so that at least some of a purging gas supplied to the annular space enters the inner space of the inner tube to satisfy an underpressure therein and prevent the drawing in of contaminents into the open end of the inner tube.

A further object of the invention is to provide an apparatus for isolating an optical surface which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
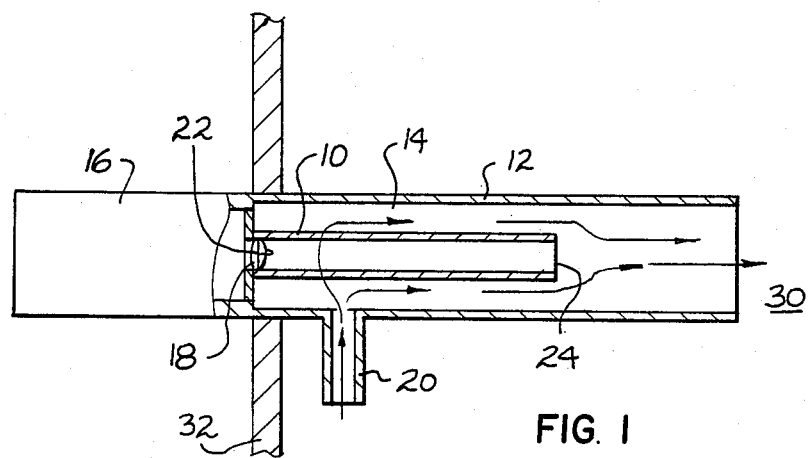
FIG. 1 is a cross-sectional view of a conventional purging system for isolating an optical surface.
Figure 2:
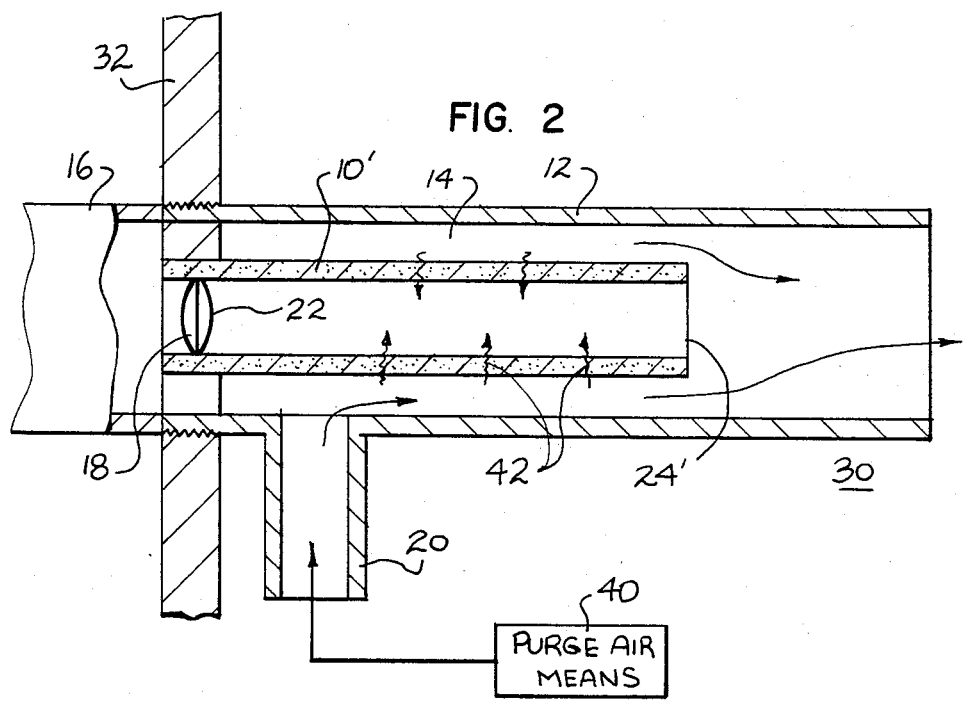
FIG. 2 is a view similar to FIG. 1, of the same system modified according to the invention.

Referring to the drawings in particular, the invention embodied in FIG. 2 comprises a system similar to that of FIG. 1. Similar reference numerals are utilized to designate the same or similar parts, with primes being added to elements which are important features of this invention.

According to the invention the inner or isolation tube 10', which like the outer tube 12 can be cylindrical or have any other cross sectional shape, is made of porous material which has a porosity of from 1 to 4 microns, and preferably 5 microns. A purging air system 40 is provided and connected through inlet 20 for supplying purging air which enters annular space 14. Space 14 surrounds the sides and open end 24' of inner tube 10'. As shown by arrows 42, at least some of the purging air filters into the inner space of air tube 10' to satisfy an aspirated or reduced pressure that would otherwise form within this space.

The tubes 10',12 can be connected to wall 32 or instrument 16 by threading as shown or by any other appropriate means such as welding, press fitting and the like.

The porous material of inner tube 10' may be one or more layers of gas filtering screen, sintered metals or other porous layers of material which provide the preferred range of porosities.

In accordance with the invention, the preferred length of tube 10' from article surface 22 of element 18 to open end 24', to the diameter of tube 10' is approximately 5 to 1.

While a specific embodiment of the invention has been shown and described in detail to illustrate the application of the principles of the invention, it will be understood that the invention may be embodied otherwise without departing from such principles.

What is claimed is:

1. An apparatus for isolating an optical surface of an optical element, from a contaminating environment, comprising:

an outer tube having one open end communicating with the contaminating environment;

an inner tube having sides and an open end, disposed in said outer tube and defining with said outer tube a purging gas space surrounding said sides and open end of said inner tube;

the optical element associated with said inner tube so that the optical surface thereof is exposed to an inner space of said inner tube with the optical surface spaced from said open end of said inner tube;

purging gas means connected to said outer tube and communicating with said purging gas space for supplying a purging gas to said purging gas space; and said inner tube being made of material having porosity within a selected range so that at least some of the purging gas supplied by said purging gas means to said purging gas space filters into said inner space to prevent aspiration of contaminents from the contaminating environment into said open end of said inner tube.

2. An apparatus according to claim 1, wherein said porosity ranges from 1 to 40 microns.

3. An appartus according to claim 2, wherein said porosity range is 5 microns.

4. An apparatus according to claim 2, wherein a length to diameter ratio of said inner tube is from about 5 to 1.

5. An apparatus according to claim 4, wherein said porous material is chosen from the group consisting of layers of filter screen and sintered metal.

6. An apparatus according to claim 5, wherein said outer and inner tubes are cylindrical and concentric with each other.

7. A method of isolating an optical surface from a contaminating environment utilizing an outer isolation tube having one end communicating with the contaminating environment with an inner tube disposed in said outer tube and defining an annular space therewith, the inner tube having an open end in the outer tube and an inner space bordered by the optical surface which is spaced from the open end of the inner tube, comprising:

making the inner tube of a porous material which is at least partially porous to a purging gas; and supplying a purging gas to the annular space so that at least some of the purging gas filters through the inner tube into the inner space thereof to prevent aspiration of contaminants from the contaminating environment into the open end of the inner tube.

8. A method according to claim 7, wherein the porosity of the inner tube is chosen to be from 1 to 40 microns.

9. A method according to claim 9, wherein the porosity of the inner tube is chosen to be 5 microns.

10. A method according to claim 8, wherein the length to diameter ratio of the inner tube is selected to be about 5 to 1.

* * * * *